3,255,271
PROCESS FOR THE PRODUCTION OF DIOLEFINS HAVING TERMINAL NON-CONJUGATED DOUBLE BONDS
Friedrich-August Fries, Marl, Kreis Recklinghausen, Germany, assignor to Chemische Werke Huls Aktiengesellschaft, Marl, Kreis Recklinghausen, Germany
No Drawing. Filed Mar. 22, 1962, Ser. No. 181,805
Claims priority, application Germany, May 31, 1961, C 24,257
10 Claims. (Cl. 260—681)

This invention relates to a novel method of preparing diolefins, and particularly diolefins having terminal non-conjugated double bonds.

It is known that butadiene may be produced by pyrolitic cleavage of n-butanediol diacetate by heating the same for a few seconds at temperatures between 510° and 650° C. Such a process, however, cannot be utilized for the production of diolefins with terminal, non-conjugated double bonds having at least 5 carbon atoms in the chain, since these non-conjugated diolefins are less stable than those with conjugated double bonds. When the former are heated to temperatures between 480 and 600° C. as required to decompose them, undesirable secondary reactions take place.

Further, structural isomerism causes displacement of the double bond. Also splitting of the molecules into olefin fragments as well as the formation of dimers inevitably results. To produce these higher diolefins having terminal double bonds, therefore, it has been necessary heretofore to utilize the Grignard or Wurtz synthesis. Such methods are too expensive for commercial use, however.

In accordance with my invention, it has been found that olefins with terminal double bonds and containing at least 5 carbon atoms in the molecule can be advantageously produced from the diesters of the respective diols of the lower aliphatic monocarboxylic acids by pyrolytic cleavage of the carboxylic acids in the vapor phase by heating the diols for about two seconds at a temperature of between 350° and 700° C.

Examples of diesters of aliphatic glycols, which may be treated in accordance with this invention, are the formic, acetic and propionic acid diesters of glycols such as 1,5 n-pentandiol, 1,6 n-heptandiol, 1,8 n-octandiol as well as the cycloaliphatic diols, e.g., hexahydroterephthalyl alcohol, etc.

In carrying out the pyrolytic cleavage of the diols, the same are introduced into a corrosion-resistant tube or tubes in the form of vapor or as a finely divided liquid or spray, and the tube heated to the required temperature. The diol is heated for a time just sufficient to bring about cleavage of the diol. This is usually less than 2 seconds, and preferably for 0.1 to 1.8 seconds. In general, the higher the temperature employed the shorter the duration of the treatment. The duration of treatment most advantageous to use depends upon the temperature chosen.

The tubes in which the reaction is carried out generally are made of alloy metal such as chromium-nickel steel, or the like material which is resistant to chemical attack by the organic acids at the temperatures employed. Tantalum tubes also may be used for this purpose, as well as tubes made of ceramic material such as porcelain, quartz, and high-melting point glasses. Inasmuch as the reaction is highly endothermic, it is preferable to use metal tubes since the heat conductance is better than when using non-metal substances.

As aforementioned, the reaction temperature may range between 350 and 700° C. depending upon the diol or diols being treated. The preferred temperature range is between 580° and 620° C. and especially on the order of 600° to 610° C. The reaction may be carried out at ordinary atmospheric pressures or above. Vacuum pressures are not required for carrying out the process but subatmospheric pressures may be employed if desired. The diols being treated may be diluted with inert gases, for example nitrogen, or vapors of lower aliphatic hydrocarbons which are inert, such as hexane or the like.

Besides the $\alpha,\omega$-diolefins the reaction mixture usually contains, depending upon the operating conditions, non-reacted diols and semi-reacted mono-olefin monolester (monohydroxyester) and which are preferably separated from the mixture after the condensation reaction and which are recycled through the system for pyrolytic separation. Prior to distillation of the $\alpha,\omega$-diolefins the lower aliphatic carboxylic acids present in the reaction mixture, and which serve to indicate the completion of the pyrolytic cleavage, are removed by washing the mixture with water or aqueous solution. Otherwise these aliphatic acids tend to form azeotropic mixtures which interfere with the fractional distillation and clean separation of the substances.

As modification of the process, the reaction temperature may be decreased and/or the duration of treatment varied whereby mainly mono-olefin monolesters are formed which may then be converted, by a secondary step, to the $\alpha,\omega$-diolefins, after having been freed of by-products.

In accordance with my pyrolytic cleavage treatment of diol diesters, as described, it has been found unexpectedly that surprisingly high yields of $\alpha,\omega$-diolefins of excellent purity are obtained. The results are achieved by heating the diol diester for less than 2 seconds at temperatures above the decomposition temperatures or isomerization temperatures respectively of the diolefins having terminal double bonds.

The following examples better describe how the process of the invention may be carried out but it will be understood that the same are not limitative of the specification and appended claims.

*Example 1*

Vapors of 1,6 hexandiol-diocetate (boiling point of 105° C. at 2 mm. pressure) are introduced into chrome-nickel steel tubes heated to 600° C. Each tube has a cross-section area of 12.5 mm.$^2$ and a length of 550 mm. The ester is passed through the tubes at the rate of 50 grams per hour, and controlled so that the duration of the heat treatment is approximately 1.8 seconds. The resultant product which consists of a mixture of $\alpha,\omega$-diolefin carboxylic acids and non-reacted esters, is cooled to room temperature (21° C.) and condensed.

The $\alpha,\omega$-diolefin is freed from acid by washing with water and fractional distillating the resultant mixture. The 1,5 hexadiene (diallyl) formed under normal pressure at 60° C. has an $n_D^{20}$ of 1.4050. The conversion of the ester is 85 to 90% of the calculated yield. Loss of non-condensable gaseous components amounts to below 2% by weight of the reaction mixture, and the yield of diolefin, based on the ester reacted, is above 90%. Further, chemical analysis indicates that only vinyl double bonds are present in the end product.

By lowering the temperature of the pyrolytic treatment to 550° C. and the throughput increased to 100–200 grams per hour, with 10 seconds heat treatment, the resultant cleavage and conversion may be made to take place to a large extent in the second stage, i.e., to produce the monoacetate of hexen-1-ol-6. In the second stage operation monoacetate, which boils at 69° C. under a pressure of 15 mm., is converted in like manner at temperatures of 575° C. to 610° C. when heated for 2 seconds duration into the corresponding diene in good yield.

Example 2

In this example diacetate of n-decanediol-1,10 boiling at 146° to 150° C. at 2 mm. pressure is heated at a temperature of 600° C. for 1.8 seconds, and utilizing the apparatus as described in Example 1, approximately 94.6% of the compound was converted, and pure n-decadiene-1,9 is obtained having a boiling point at atmospheric pressure (760 mm. Hg) of 169 to 170° C., $n_D^{20}$ 1.4326, $d_4^{20}$ 0.755 and bromine number of 2302 (2318 calculated). A yield of 88% based on the reacted ester is obtained and the analysis shows the diene structure consists of only vinyl double bonds.

Example 3

In this instance 50 grams of the diacetate of hexahydroterephthalylalcohol (boiling point 120°–123° C.) is vaporized and passed through heated tubes as described in Example 1. The vapors are subjected to a temperature of 610° C. A reaction mixture is obtained containing approximately 56% dimethylene-1,4 cyclohexane (boiling point of 122° C. at 760 mm. Hg. $n_D^{20}$ 1.4721, $d_4^{20}$ 0.821 and bromine number of 300 (296.3 calculated). Approximately 22% of a partially cleaved product is recovered consisting of the acetate of 1-methylene-hexahydrobenzyl alcohol (B.P. 96–97° C.) $n_D^{20}$ 1.4350, $d_4^{20}$ 0.961; and having a saponification number of 332 (333.2 calculated), acid value 0.0 and bromine number of 962 (calculated 952.1). The partially cleaved product is recycled through the apparatus to complete the cleavage to recover another 16% yield of the dimerized diene of which 4% consists of non-reacted diacetate.

It will be understood that the invention is susceptible to modifications and substitution of equivalent reactants as may be desired by those skilled in the art, and which is intended to be comprehended within the scope of this invention and as set forth in the appended claims.

What is claimed is:

1. A process for the production of diolefins with terminal, non-conjugated double bonds having at least 5 carbon atoms in the molecule, said process comprising heating lower aliphatic monocarboxylic acid diesters of α,ω-diols having at least 5 carbon atoms in the molecule for less than two seconds at a temperature of 350° to 700° C. to effect pyrolytic cleavage of the said diols, and recovering the resultant diolefins.

2. A process for the production of diolefins as set forth in claim 1, characterized in that the mono-olefin monoesters are produced in the initial stage of the reaction which are separated from the reaction mixture and then subjected to pyrolytic treatment to effect cleavage thereof into diolefins.

3. A process for the production of diolefins as set forth in claim 1, characterized in that the cleaved, lower aliphatic carboxylic acids present in the reaction mixture, and which serve to indicate the completion of the pyrolytic cleavage, are removed by washing the reaction mixture with aqueous solution, and followed by fractional distillation.

4. The process of claim 1, wherein the pyrolysis reaction time is 0.1–1.8 seconds.

5. The process of claim 1, wherein the pyrolysis temperature is 580–620° C.

6. The process of claim 1, wherein the pyrolysis temperature is 600–610° C.

7. The process of claim 6, wherein the pyrolysis reaction time is 0.1–1.8 seconds.

8. A process for the preparation of 1,5-hexadiene, which process comprises heating vapors of 1,6-hexane-diol-diacetate at 600° C. for 1.8 seconds.

9. A process for the preparation of n-decadiene-1,9, which process comprises heating n-decane diol-1,10-diacetate at 600° C. for 1.8 seconds.

10. A process for the preparation of dimethylene-1,4-cyclohexane, which process comprises heating the diacetate of hexahydroterephthalyl alcohol at 610° C. for less than 2 seconds.

References Cited by the Examiner
UNITED STATES PATENTS

| | | | |
|---|---|---|---|
| 2,251,983 | 8/1941 | Chitwood | 260—681 |
| 2,398,103 | 4/1946 | Long | 260—681 |
| 2,957,929 | 10/1960 | De La Mare | 260—681 |

ALPHONSO D. SULLIVAN, *Primary Examiner.*

P. M. COUGHLAN, *Assistant Examiner.*